Dec. 27, 1932.  F. C. HECKROTH  1,892,189
PISTON PACKING
Filed May 2, 1932
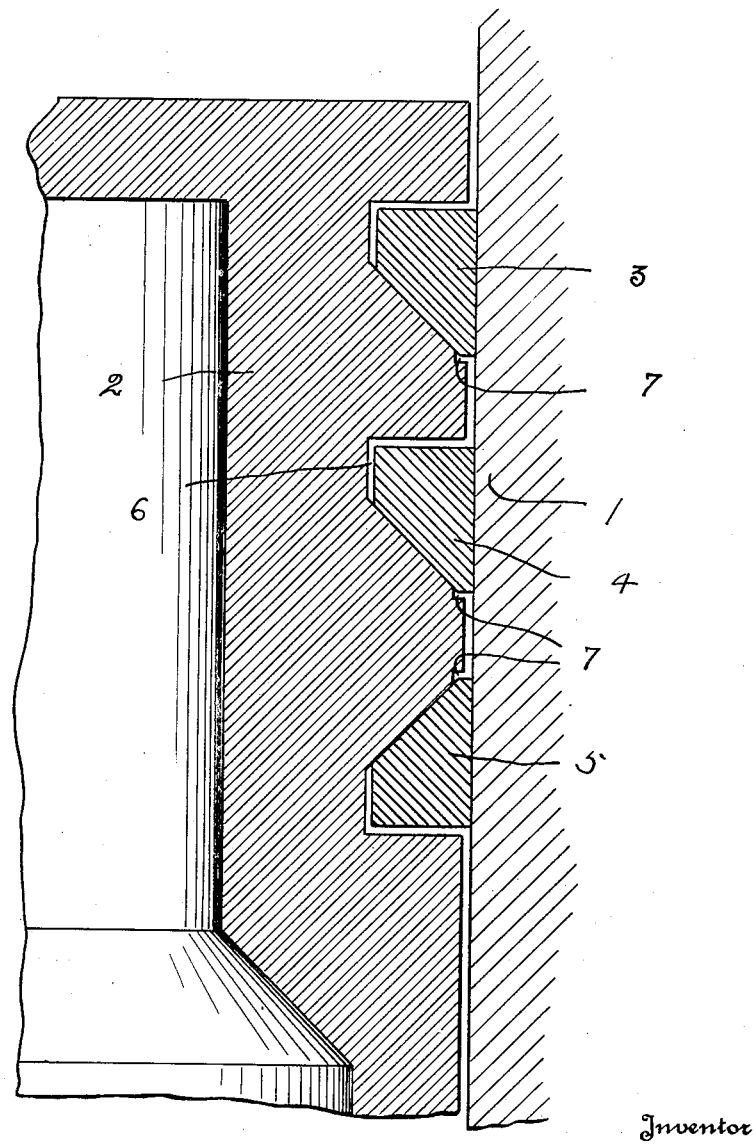
Inventor
Frederic C. Heckroth.
By Geo. Stevens.
Attorney Patented Dec. 27, 1932

1,892,189

UNITED STATES PATENT OFFICE

FREDERIC C. HECKROTH, OF DULUTH, MINNESOTA, ASSIGNOR OF ONE-HALF TO PETER L. BERKE, OF DULUTH, MINNESOTA

PISTON PACKING

Application filed May 2, 1932. Serial No. 608,753.

This invention relates to pistons and rings therefor, and has special reference to an improved form of packing for internal combustion engine pistons where the control of lubricating oil, as well as gas, is essential.

The principal object of the invention is to produce a piston packing as nearly as possible of the common construction with the added feature of improved oil control and efficiency.

Other objects and advantages of the invention will appear in the following description thereof.

In the accompanying drawing, forming part of this application, and wherein like reference characters indicate like parts, the figure is an enlarged sectional view through one wall of a cylinder and piston therein.

As is well known, the common packing ring is rectangular in cross-section and dependent almost wholly upon its predetermined expansive properties for close fit within the cylinder, and, while I am aware that various attempts have been made to change the general shape of the piston ring and additional cooperative parts with like objects to my present invention in view, the instant construction contemplates a ring as nearly as possible of standard shape for accomplishing such; and, while it is true that rings of somewhat similar shape in cross section are old and associated with movable cooperative parts, these latter have not been of the type and construction as shown by me, nor do they function in a like manner.

Referring now to the accompanying drawing, the numeral 1 represents one side wall of the cylinder and 2 an adjacent side wall of the piston, while 3, 4 and 5 represent the packing rings. These latter are of substantially triangular shape and are designed each to fit within an annular groove 6 having its upper or lower wall as the case may be inclined for contact with the inclined surface of the ring.

A small rectangular annular oil groove 7 is provided for each ring groove, and is preferably located at the outer terminus of the inclined wall of the ring groove, providing means for the retaining of surplus oil removed from the walls of the cylinder during reciprocation of the piston, thus insuring lubrication of the cylinder walls adjacent the leading active edge of each ring. It may here be noted that the first experiments of applicant with a set of rings of this type was much less efficient than anticipated and that subsequently these oil grooves were provided to prevent apparent undue wear of the rings thus automatically urged to their work, and that immediately on providing these oil chambers, the results proved ideal.

The arrangement of the rings in the embodiment here illustrating the invention is believed novel in that there are two uppermost or compression rings with the oil grooves adjacent the lower cylinder contacting edges thereof, while the lower or oil ring is of identical shape but turned upside down and whose expansion is augmented during the descent of the piston in a similar manner to the augmentation of the upper pair of rings during the compression stroke of the engine.

It is to be further noted that at no time under normal wear of the cylinder or rings are the grooves 7 closed by the narrower edge of the ring, as it is apparent that in the illustration here shown the space between the piston and cylinder walls is considerably greater than in actual practice; this being for convenience of illustration.

Having thus described my invention, what I claim and desire to secure by Letters Patent, is:

In combination a piston having three cooperative packing ring grooves, one wall of all of the grooves being horizontal and parallel, one wall of two of the grooves being inclined and parallel, and one wall of the other groove being inclined but in the opposite direction to the inclined walls of the other grooves, a packing ring for each groove having a minor and major parallel wall, and said piston being provided with a minor stepped groove at the terminus of the inclined wall of each groove for cooperative association with the minor wall of each ring.

In testimony whereof I affix my signature.

FREDERIC C. HECKROTH.